(12) United States Patent
Basehore et al.

(10) Patent No.: US 9,361,851 B1
(45) Date of Patent: Jun. 7, 2016

(54) ELECTROCHROMIC TWO WAY DISPLAY FOR TWO IN ONE LAPTOP/TABLET FORM FACTORS

(71) Applicant: GOOGLE INC., Mountain View, CA (US)

(72) Inventors: Derek Basehore, San Francisco, CA (US); Nicholas Jordan Sanders, Saratoga, CA (US)

(73) Assignee: GOOGLE INC., Mountain View, CA (US)

( * ) Notice: Subject to any disclaimer, the term of this patent is extended or adjusted under 35 U.S.C. 154(b) by 24 days.

(21) Appl. No.: 14/217,980

(22) Filed: Mar. 18, 2014

(51) Int. Cl.
 *G02F 1/153* (2006.01)
 *G09G 3/38* (2006.01)
 *G02F 1/163* (2006.01)

(52) U.S. Cl.
 CPC *G09G 3/38* (2013.01); *G02F 1/153* (2013.01); *G02F 1/163* (2013.01)

(58) Field of Classification Search
 CPC ............... G02F 1/15; G02F 1/133603; H01L 2924/12044; G06F 1/1616
 USPC .......................... 359/265, 267–274; 345/105
 See application file for complete search history.

(56) References Cited

U.S. PATENT DOCUMENTS

| | | | |
|---|---|---|---|
| 6,574,487 B1 | 6/2003 | Smith et al. | |
| 8,362,992 B2 | 1/2013 | Kuhlman et al. | |
| 8,411,069 B1 | 4/2013 | Huang | |
| 2005/0073627 A1 | 4/2005 | Akiyama | |
| 2006/0244880 A1 | 11/2006 | Onishi et al. | |
| 2007/0139585 A1 | 6/2007 | Xiong et al. | |
| 2008/0174718 A1 | 7/2008 | Ma et al. | |
| 2012/0050975 A1 | 3/2012 | Garelli et al. | |
| 2015/0221283 A1* | 8/2015 | Jia ........................ | G09G 3/3266 345/207 |

* cited by examiner

*Primary Examiner* — Mahidere Sahle
(74) *Attorney, Agent, or Firm* — Brake Hughes Bellermann LLP (57) ABSTRACT

In one general aspect, a computing device can include a base, and a lid coupled to the base, the lid housing a display device that includes a first electrochromic material, a second electrochromic material, and an organic light emitting diode (OLED) display. The OLED display can be located between the first electrochromic material and the second electrochromic material.

20 Claims, 6 Drawing Sheets

ELECTROCHROMIC TWO WAY DISPLAY FOR TWO IN ONE LAPTOP/TABLET FORM FACTORS

TECHNICAL FIELD

This description generally relates to computing devices. The description, in particular, relates to display devices used in computing devices.

BACKGROUND

Computing devices or systems can vary in shape and size, and can include laptop computers, netbook computers, and tablet computers. The computing devices can include a display device (e.g., an integrated monitor or touchscreen) among other elements, such as audio systems, wireless networking hardware, and user interface devices, such as keyboards and pointing devices. In some implementations, the display device of a computing device can be a touchscreen display that can also function as an input device.

A user may be able to use a computing device in multiple modes of operation. For example, the computing device can include a lid that houses the display device and a base that can include one or more input devices, such as a keyboard, a pointing stick, mouse buttons, a touchpad, and/or a trackpad. The lid can be attached to the base such that the lid can be moved and/or rotated with respect to the base so that the computing device can be placed into multiple positions. For example, in a closed position, the front of the lid of the computing device (the front of the touchscreen display) can face, and/or be in contact with, the top of the base of the computing device. In this position, the computing device can be used in a tablet mode if a user can interact with the side of the touchscreen display (the rear of the touchscreen display) not facing the base of the computing device. In some implementations, however, the lid that houses the display device may be constructed of an opaque material which could prevent a user from interacting with the computing device in a tablet mode when the computing device is placed in a closed position, even if the side of the touchscreen display (the rear of the touchscreen display) not facing the base of the computing device permitted such interactions.

In an open position, for example, a user of the computing device can view and interact with both the front of the touchscreen display and the input devices included in the base. An open position for the computing device can be where the lid of the computing device is placed out of contact with and in a stationary position with respect to the base of the computing device. For example, the lid can be placed at approximately a 130 degree angle with respect to the base. This example open position can be considered a laptop mode of operation for the computing device.

In some implementations, the lid can be rotated so that the back of the lid contacts/faces the bottom of the base of the computing device (e.g., a 360 degree rotation of the lid from the closed position). In this position, the computing device can also be used in a tablet mode as a user can interact with the front of the touchscreen display. In order for the lid to rotate 360 degrees with respect to the base of the computing device, however, one or more hinges used to couple the lid of the computing device to the base of the computing device need to be implemented accordingly. As computing devices become lighter, smaller, and thinner, it may be difficult to implement the one or more hinges to allow 360 degree rotation of the lid with respect to the base, while maintaining both the decreased size of the computing device and the ability of a user to operate the computing device in multiple modes (e.g., a tablet mode, a laptop mode).

Thus, a need exists for systems, methods, and apparatus to address the shortfalls of present technology and to provide other new and innovative features.

SUMMARY

In one general aspect, a computing device can include a base, and a lid coupled to the base. The lid can house a display device including a first electrochromic material, a second electrochromic material, and an organic light emitting diode (OLED) display. The OLED display can be located between the first electrochromic material and the second electrochromic material.

Example implementations may include one or more of the following features. For instance, the computing device can further include a first glass panel including a first side and a second side. The first electrochromic material can be applied to the second side of the first glass panel. The computing device can further include a second glass panel including a first side and a second side. The second electrochromic material can be applied to the first side of the second glass panel. The OLED display can be included in a third glass panel, the OLED display being formed on a side of the third glass panel. The display device can further include a first touch sensitive panel. The first touch sensitive panel can be located between the first electrochromic material and the OLED display. The first touch sensitive panel can be located between the second electrochromic material and the OLED display. The display device can further include a second touch sensitive panel. The second touch sensitive panel can be located between the first electrochromic material and the OLED display. The computing device can further include a display controller coupled to each of the first electrochromic material, the second electrochromic material, and the OLED, the display controller being configured to apply control signals to the first electrochromic material, the second electrochromic material, and the OLED display.

In another general aspect, a method of operating a computing device can include receiving, by the computing device, one or more input indicators, identifying, based on the received one or more input indicators, an operating mode of the computing device, and based on identifying the operating mode of the computing device, setting a first voltage to a first value, the first voltage being applied to a first electrochromic material included in a first part of a display device included in a lid portion of the computing device, and setting a second voltage to a second value, the second voltage applied to a second electrochromic material included in a second part of a display device included in the lid portion of the computing device.

Example implementations may include one or more of the following features. For instance, the operating mode of the computing device can be a laptop mode. Setting the first voltage to the first value can cause the first electrochromic material to become transparent. Setting the first voltage to the first value can include removing the first voltage from the first electrochromic material. Setting the second voltage to the second value can cause the second electrochromic material to become opaque. Setting the second voltage to the second value can include applying the second voltage to the second electrochromic material. The operating mode of the computing device can be a tablet mode. Setting the first voltage to the first value can cause the first electrochromic material to become opaque. Setting the first voltage to the first value can include applying the first voltage to the first electrochromic material. Setting the second voltage to the second value can cause the second electrochromic material to become transparent. Setting the second voltage to the second value can include removing the second voltage from the second electrochromic material. The first voltage can be applied to the first electrochromic material by a display controller included in the computing device. The second voltage can be applied to the second electrochromic material by the display controller.

In yet another general aspect, a display device can include a first glass panel part including a first side and a second side, a second glass panel part including a first side and a second side, a third glass panel part including an organic light emitting diode (OLED) display, a first side and a second side, the OLED display being formed on the first side, a first touch sensitive panel including a first side and a second side, and a second touch sensitive panel including a first side and a second side. The first electrochromic material can be applied to the second side of the first glass panel part. A second electrochromic material can be applied to the first side of the second glass panel part. The third glass panel part can be located between the first touch sensitive panel and the second touch sensitive panel, the first side of the third glass panel part being located adjacent to the second side of the first touch sensitive panel, and the second side of the third glass panel part being located adjacent to the first side of the second touch sensitive panel. The second side of the first glass panel part can be located adjacent to the first side of the first touch sensitive panel. The first side of the second glass panel part can be located adjacent to the second side of the second touch sensitive panel.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

Described herein is a two-way display device that can be incorporated into a computing device. A user of the computing device can view content rendered by the two-way display device on either side (and in some cases simultaneously on both sides) of the display device. When viewed from a first side (the content-rendering side), a second side of the two-way display can become opaque, and, when viewed from the second side (the content-rendering side), the first side of the two-way display device can become opaque. The opaque side of the computing device can provide a uniform background behind the content-rendering side of the two-way display device. In some implementations, if the non-content rendering side of the two-way display device is transparent, a user viewing content from the content-rendering side of the two-way display device would be able to effectively "see through" the display, and view whatever may be behind the display (e.g., a keyboard) at the time of the viewing.

Figure 2:
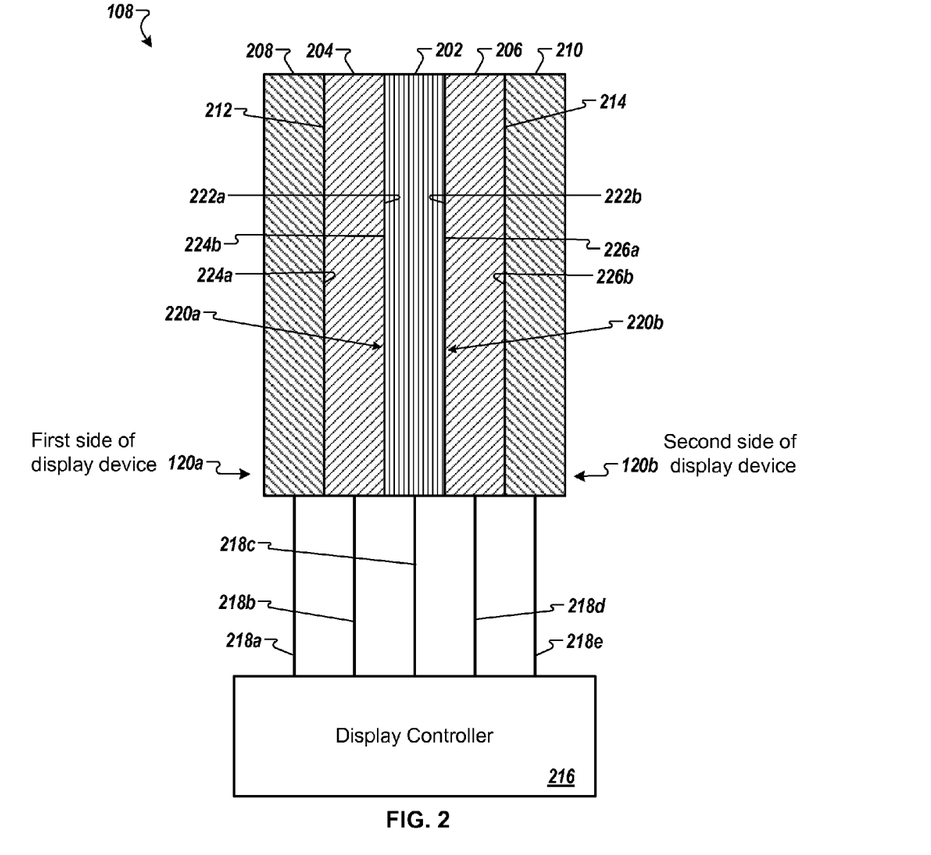
FIG. 2 is a cross-sectional view of an example two-way display device included in the computing devices described herein.

For example, as will be described in more detail with reference to FIGS. 2A and 2B, a lid of a computing device can house a two-way display device. When the computing device is in a closed position (e.g., the front of the lid of the computing device faces/contacts the top of the base of the computing device), a first side of the two-way display device faces/contacts the top of the base of the computing device. In many cases, the top of the base of the computing device can include one or more input devices, such as a keyboard, a pointing stick, mouse buttons, a touchpad, and/or a trackpad. The second side of the two-way display device can render content for viewing by a user of the computing device, while the first side of the two-way display device becomes opaque. In this configuration, the computing device can be considered in a tablet mode of operation. The opaque first side of the two-way display device blocks/conceals any viewing of the input devices included in the base of the computing device as the user views/interacts with the content displayed on the content-rendering second side of the two-way display device.

In another example, as will be described in more detail with reference to FIGS. 1A and 1B, a lid of a computing device can house a two-way display device. When the computing device is in an open position shown (e.g., the lid of the computing device is at a 130-degree angle with respect to a base of the computing device), a first side of the two-way display device can render content for viewing by a user of the computing device, while the user interacts with one or more input devices included in the base of the computing device. In addition, the second side of the two-way display device is opaque. In this configuration, the computing device can be considered to be in a laptop mode of operation. The opaque second side of the two-way display device provides privacy and hides what is behind the computing device from being seen by the user of the computing device as they view the content rendered on the first side of the two-way display device.

In some implementations, the two-way display device can include two displays placed against one another (e.g., back-to-back liquid crystal display (LCD) modules where each LCD module includes backlighting). In these implementations, one display may display content while the other display remains effectively in an "off" state. In other cases, both displays may be placed on an "off" state. In other cases, both displays may display the same or similar content (e.g., a second display can display the mirror image of the content being displayed on the first display). A computing device that includes a two-way display device with two displays can be large, heavy and cumbersome. In some implementations, natural lighting may be used in place of backlighting for an LCD. However, when the computing device is placed in a tablet mode of operation (e.g., the front of the lid of the computing device faces/contacts the top of the base of the computing device), little if any natural lighting is available to effectively backlight the LCD.

In some implementations, the two-way display device can include a single display that can be viewed from both sides (e.g., an organic light emitting diode (OLED) display (OLED)). An OLED display includes OLEDs configured in a particular pattern (e.g., an x-y grid) that emit light when a voltage is applied to the diode. The organic layers for the OLEDs can be patterned and deposited on a substrate that includes a backplane. The backplane can include switching and driving circuitry for the OLEDs. The substrate can be encapsulated, forming an OLED display. In some implementations, the substrate can include a rigid, non-bendable material such as a rigid glass panel or a rigid plastic panel. In some implementations, the substrate can include a bendable material that can include, but is not limited to, plastic, metal, or flexible glass. OLED displays, dependent on the substrate, can be viewed from both the front and the back of the display. In some implementations, when a transparent substrate is used, the OLED display can be viewed from both sides. In these implementations, the OLED display may be referred to as a transparent OLED display. In other implementations, when an opaque substrate is used, the OLED display can be viewed from the side on which the OLEDs are deposited on the opaque substrate.

An electrochromic film/material (or some variant) can be included on both sides of the two-way display device. A voltage can be applied to the electrochromic material to change the state of the material from a transparent/see-through state to a translucent/opaque state. A voltage applied to the electrochromic material causes a chemical reaction in the electrochromic material that changes the properties of the electrochromic material (e.g., the way the electrochromic material reflects and absorbs light). In some implementations, the electrochromic material can be included in a piece/pane of glass. In some implementations, the electrochromic material can be included in a piece of plastic. For example, the electrochromic material can be sandwiched between two panes of glass (or plastic) that includes additional layers of other materials. The layers can include, but are not limited to, a first panel, a first conducting oxide layer, an electrochromic layer (e.g., tungsten oxide), an ion conductor/electrolyte layer, an ion storage layer, a second conducting oxide layer, and a second panel. The layers may be presented in the order listed above, or, in some implementations, the order of the layers may be different. A power source is connected/coupled to the first conducting oxide layer and the second conducting oxide layer. A voltage applied to the conducting oxide layers causes the ions in the ion storage layer to migrate through the ion conducting layer to the electrochromic layer, making the glass opaque. Removing/not applying the voltage to the conducting oxide layers causes the ions to migrate out of the electrochromic layer and back into the ion storage layer, making the glass transparent.

In some implementations, the two-way display device can include one or more glass (or plastic) panels that can incorporate suspended particle, or polymer dispersed liquid crystal (PDLC) technologies. For example, a suspended particle device (SPD) can include nano-scale particles suspended in a liquid suspension encapsulated between two panes of glass (or plastic), where each pane is coated with a conductive material. Applying a voltage to the two panes via the conductive coating results in the nano-scale particles aligning themselves, allowing light to pass through the two panes. Removing the voltage (not applying the voltage) results in the nano-scale particles free-floating in the liquid suspension, blocking light from passing through the two panes. Similarly, for example, a PDLC device can include a liquid crystal layer with a liquid crystal film on each side of the liquid crystal layer. The PDLC device can be included between two panes of glass or plastic. Applying a voltage to the two panes via the liquid crystal films results in the liquid crystals aligning themselves, allowing light to pass through the two panes. Removing the voltage (not applying the voltage) results in random orientation of the liquid crystals, blocking light from passing through the two panes.

For example, when the computing device is in an open position, the electrochromic material on a second side of the two-way display device can be placed into an opaque state, providing an opaque background to the display while a user views/interacts with content rendered on a first side of the display because the electrochromic material on the first side of the two-way display device is placed into a transparent state. In another example, when the computing device is in an closed position, the electrochromic material on a first side of the two-way display device (the side of the two-way display device facing the base of the computing device) can be placed into an opaque state, providing an opaque background to the display (e.g., blocking a view of input devices included in the base of the computing device). Meanwhile, a user can view/interact with content rendered on a second side of the display because electrochromic material on the second side of the two-way display device is placed into a transparent state.

Using a single computing device in both a laptop mode of operation and a tablet mode of operation (e.g., a two-in-one computing device) requires placement of a lid of the computing device in multiple static positions. In some implementations that do not include a two-way display device, a tablet mode of operation of the computing device is achieved by rotating the lid of the computing device 360 degrees with respect to the base of the computing device. An example of this mode of operation will be described in more detail with respect to FIGS. 3A-B. This mode of operation, however, involves a hinge that can rotate the lid of the computing device 360 degrees. In some cases, the size of the hinge can be cumbersome and may contribute to an increase in the overall thickness of the computing device. In addition, when a user interacts with the computing device as a tablet, the input devices included in the base of the computing device are exposed. Though they may be disabled by the computing device when the computing device is placed into the tablet mode of operation, they may hinder the user experience.

Figures 1A, 1B:
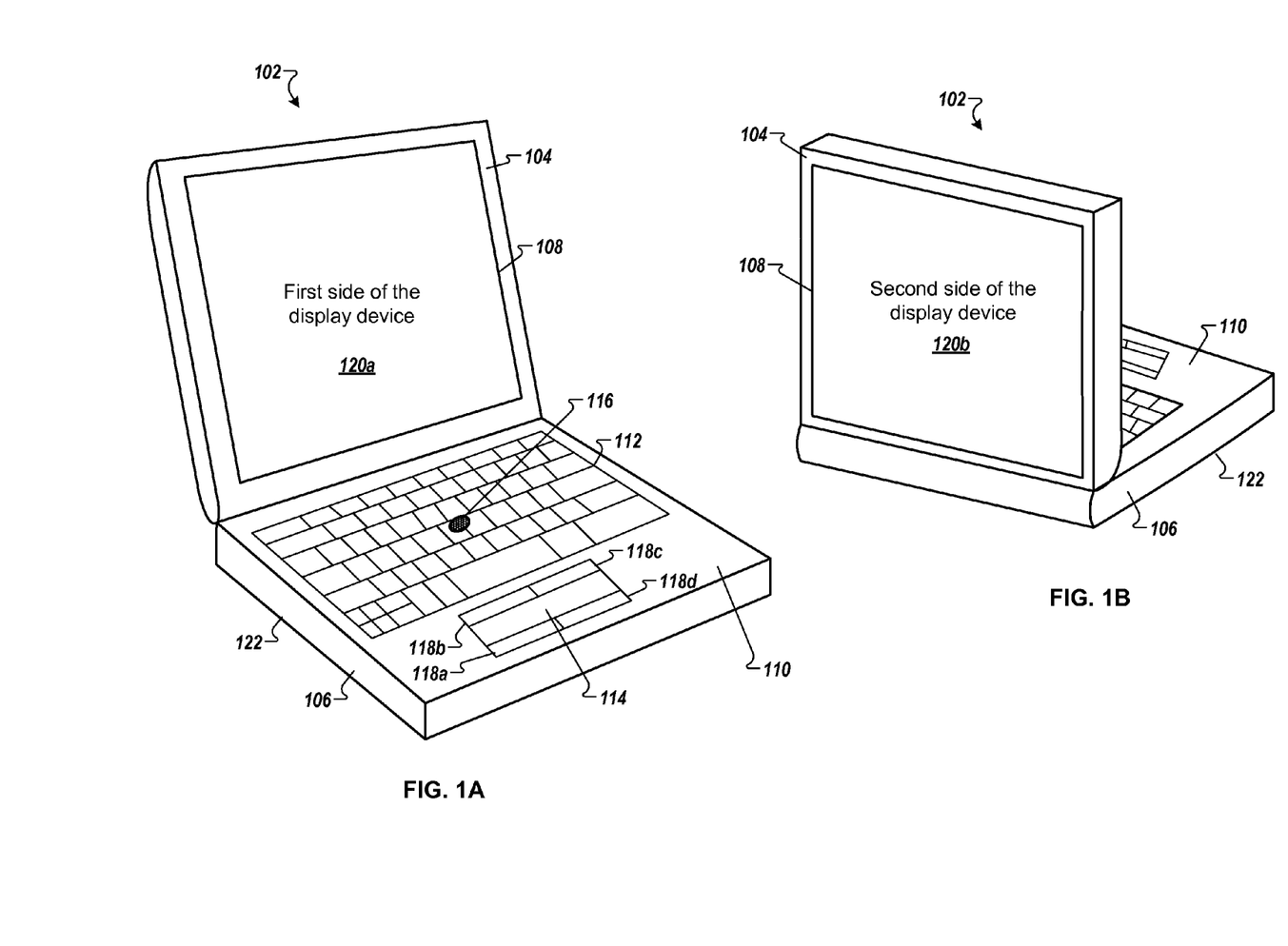
FIGS. 1A and 1B are diagrams that illustrate an example computing device in a laptop mode of operation.

FIGS. 1A and 1B are diagrams that illustrate an example computing device 102 in a laptop mode of operation. In the example shown in FIGS. 1A and 1B, the computing device 102 includes a lid portion 104 and a base portion 106. The base portion 106 includes an input area 110. The input area 110 includes a keyboard 112, a trackpad 114, a pointer button 116, and mouse buttons 118a-d. For example, the computing device 102 can be placed on a surface where a bottom 122 of the base portion 106 rests on the surface while a user interacts with the computing device 102.

The lid portion 104 includes a two-way display device 108 (e.g., a two-way touch-sensitive display device, a two-way touchscreen) that is part of (housed within/mounted on) the lid portion 104 of the computing device 102. For example, the two-way display device 108 can include a first side 120a and a second side 120b.

For example, the computing device 102 as shown in FIG. 1A can be considered in a laptop mode of operation. In a laptop operating mode, a user of the computing device 102 can interact with the keyboard 112, the trackpad 114, the pointer button 116, and the mouse buttons 118a-d included in the input area 110 while viewing/interacting with content rendered on the first side 120a of the two-way display device 108. FIG. 1B shows the computing device 102 in the laptop mode of operation, viewing the two-way display device 108 from the second side 120b (e.g., a user is looking at the back of the lid portion 104).

Figures 1C, 1D:
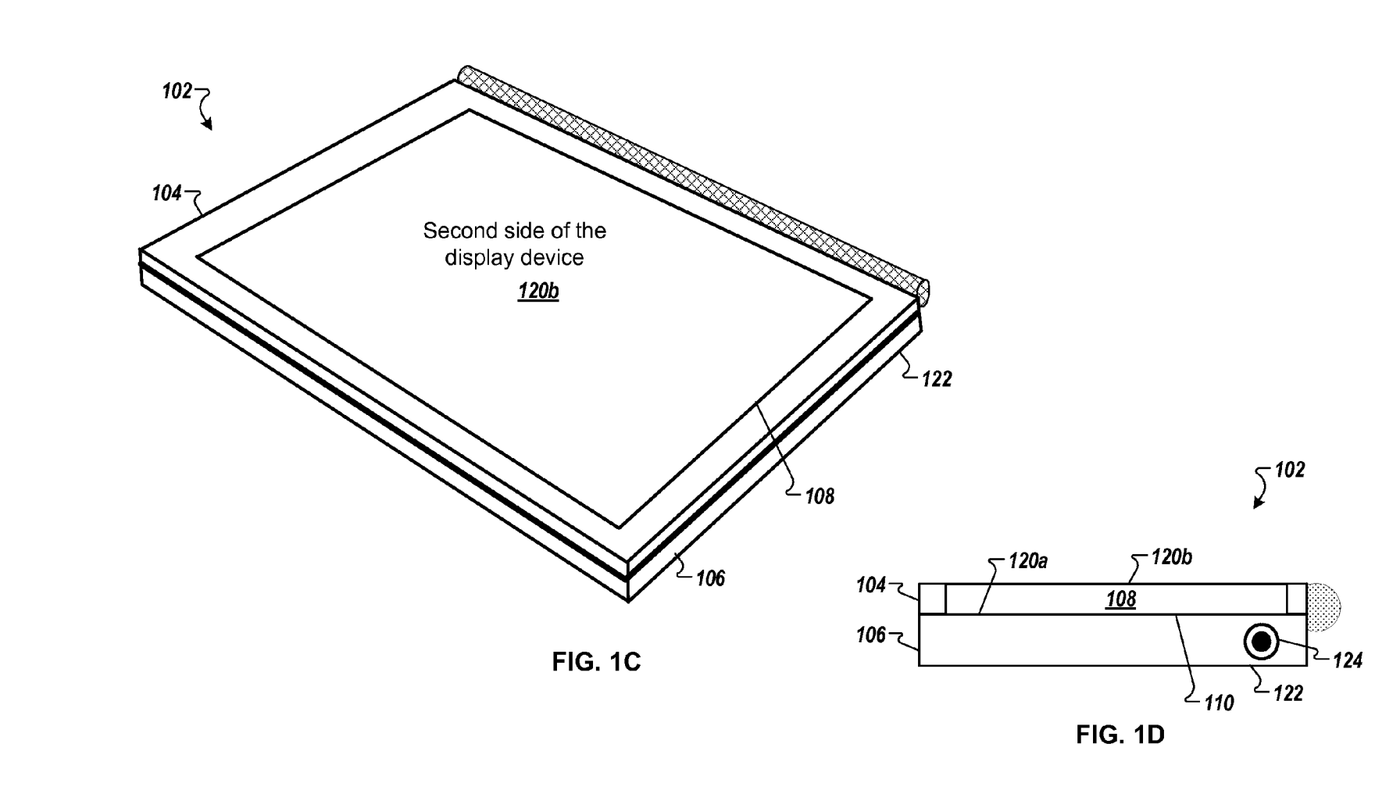
FIGS. 1C and 1D are diagrams that illustrate an example computing device in a tablet mode of operation.

FIGS. 1C and 1D are diagrams that illustrate the example computing device 102 in a tablet mode of operation. In the tablet mode of operation shown in FIGS. 1C and 1D, the computing device 102 is in a closed position where the lid portion 104 faces and/or is in contact with the base portion 106. In a side view of the computing device 102 in a closed position, as shown in FIG. 1D, the input area 110 of the base portion 106 faces, and/or is in contact with, the first side 120a of the two-way display device 108 included in the lid portion 104. A top view of the computing device 102 in the closed position is shown in FIG. 1C. In the closed position, a user can view/interact with content displayed on the second side 120b of the computing device 102.

The computing device 102 can include a mode indication switch 124. The mode indication switch 124 can be a momentary push-button type switch. A user of the computing device 102 can press the mode indication switch 124 after closing the computing device 102 if the user intends to further use the computing device 102 in a tablet mode of operation.

In some implementations, when the computing device is in a laptop mode of operation, software running on the computing device 102 can display content on the first side 120a of the computing device 102. When the computing device 102 is in a tablet mode of operation, software running on the computing device 102 can display a mirror-image of the same content on the second side 120b of the computing device 102. The mirror image ensures that content is orientated correctly (e.g., text is not displayed backwards).

Figures 1E, 1F:
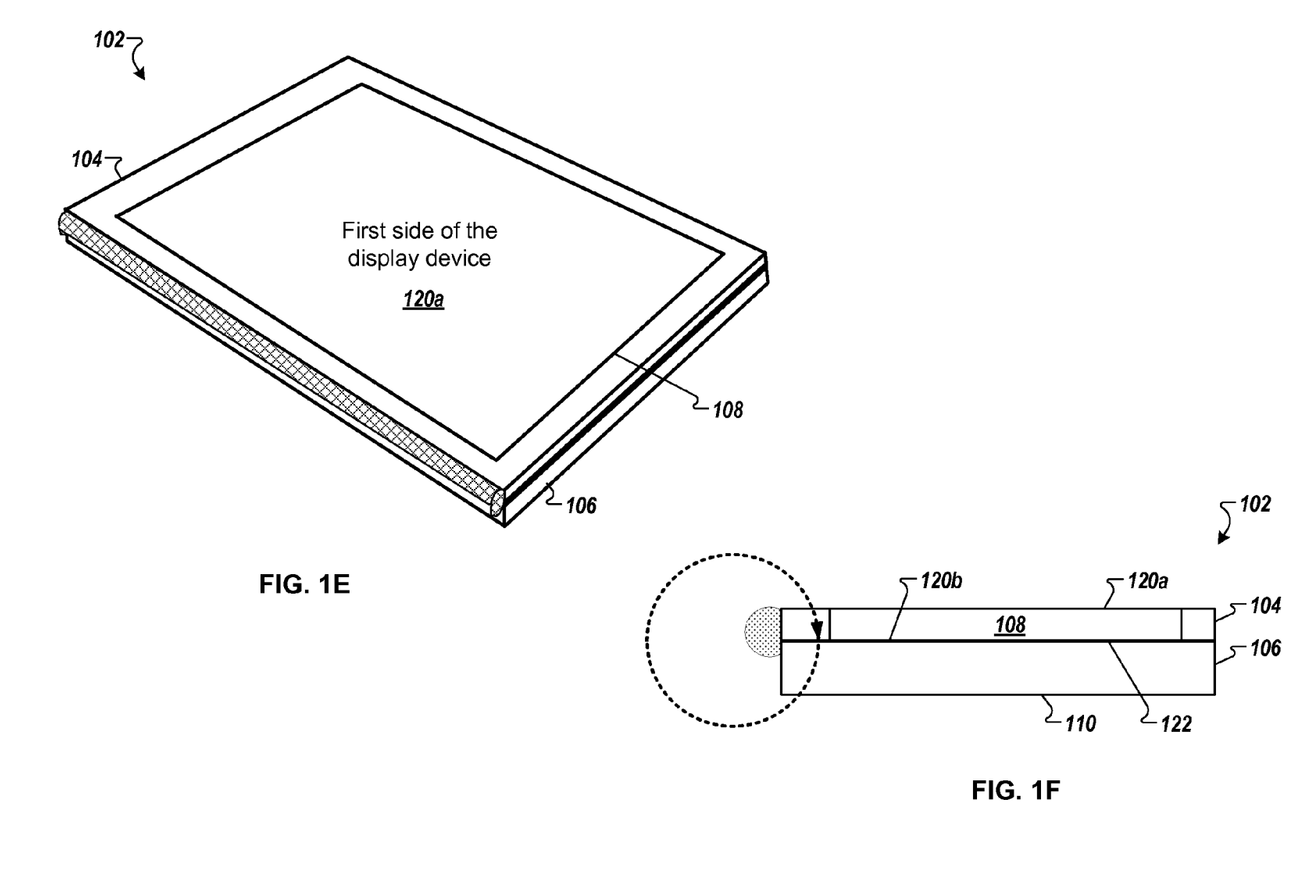
FIGS. 1E and 1F are diagrams that illustrate an example computing device in an alternate tablet mode of operation.

FIGS. 1E and 1F are diagrams that illustrate the example computing device 102 in an alternate tablet mode of operation. In the alternate tablet mode of operation shown in FIGS. 1E and 1F, the computing device 102 is in a position where the lid portion 104 is rotated 360 degrees with respect to the base portion 106. In the side view of the computing device 102 (shown in FIG. 1F), while in the alternate tablet mode of operation the second side 120b of the two-way display device 108 faces and/or is in contact with the bottom 122 of the base portion 106, leaving the input area 110 exposed. A top view of the computing device 102 in the alternate tablet mode of operation is shown in FIG. 1C. In the alternate tablet mode of operation, a user can view/interact with content displayed on the first side 120a of the computing device 102. However, the alternate tablet mode of operation may be awkward as the input area 110 is exposed, making the computing device 102 cumbersome when used in the alternate tablet mode of operation.

FIG. 2 is a cross-sectional view of an example two-way display device included in the computing devices described herein. For example, referring to FIGS. 1A-1F, the cross-sectional view shows the first side 120a and the second side 120b of the two-way display device 108. The example two-way display device 108 is formed of multiple layers. The multiple layers include a display 202, a first touch panel 204, a second touch panel 206, a first glass panel 208, and a second glass panel 210. As such, the two-way display device 108 can be used as a touch-sensitive display (touchscreen) from the first side 120a and the second side 120b.

An electrochromic material is applied to a back surface 212 of the first glass panel 208. An electrochromic material is applied to a front surface 214 of the second glass panel 210. The electrochromic material is placed on the back surface of each glass panel so that the glass panel can provide protection for the electrochromic material (e.g., a user of the computing device 102 may not contact the electrochromic material, the electrochromic material is not exposed to any outside contact).

A display controller 216 provides control signals 218a-e to each of the multiple layers of the two-way display device 108: the first glass panel 208, the first touch panel 204, the display 202, the second touch panel 206, and the second glass panel 210, respectively. Control signals 218b and 218d can control the operation of the first touch panel 204 and the touch panel 206, respectively. The control signals 218b and 218d can send data to, and receive data from, the first touch panel 204 and the touch panel 206, respectively. One or more control signals 218c can control the operation of the display 202. The control signals 218c can send data to and receive data from the display 202. For example, the control signals 218c can control the switching and driving circuitry for the OLEDs included in the backplane of the OLED display.

In some implementations, the display 202 included in the two-way display device 108 can be an OLED display formed on a surface of an opaque panel (e.g., an opaque glass panel). In these implementations, the display 202 can be viewed from the side on which the OLED display is formed on the surface of the opaque panel. In the example computing device 102, the OLED display can be formed on the display first surface 222a in order to use the computing device 102 in a laptop mode as shown with reference to FIGS. 1A and 1B. In these implementations, the touch panel 206 and the second glass panel 210 can be eliminated from the two-way display device 108.

Due to the opaque nature of the panel on which the OLED display is formed, the display 202 cannot be viewed from the display second side 220b. When using the computing device 102 in a tablet mode of operation, therefore, a user can rotate the lid portion 104 of the computing device 102 approximately 360 degrees with respect to the base portion 106 to use the computing device 102 in the alternate tablet mode as shown in FIGS. 1E and 1F.

In some implementations, the display 202 included in the two-way display device 108 can be an OLED display formed on a surface of a transparent glass panel. In these implementations, the display 202 can be viewed from both sides (a display first side 220a and a display second side 220b) because the glass panel is transparent. In some implementations, the OLED display can be formed on a display first surface 222a. In other implementations, the OLED display can be formed on a display second surface 222b. The glass panel can provide a non-flexible surface for placement of the OLEDs making integration of the OLEDs as the display in a multilayer display device easier.

Referring to FIGS. 1A and 1B, in some implementations, when the computing device 102 is in a laptop mode of operation, the second side 120b of the two-way display device 108 can be opaque, while the first side 120a of the two-way display device 108 can be transparent. The display 202 can be an OLED display formed on a surface of a transparent glass panel. The display controller 216 can provide a signal 218e (e.g., a voltage) to the electrochromic material applied to the front surface 214 of the second glass panel 210. The signal 218e causes the electrochromic material to become opaque, blocking the view of the display 202 from the second side 120b of the two-way display device 108. In addition, the display controller 216 can remove a signal 218a (e.g., not apply a voltage) to the electrochromic material applied to the back surface 212 of the first glass panel 208. Removing/not applying the signal 218a causes the electrochromic material to become transparent, allowing the viewing of the display 202 from the first side 120a of the two-way display device 108.

Referring to FIGS. 1E and 1F, in some implementations, when the computing device 102 is in an alternate tablet mode of operation, the two-way display device 108 can be placed in the same mode of operation as in the laptop mode of operation. The second side 120b of the two-way display device 108 can be opaque, while the first side 120a of the two-way display device 108 can be transparent. A user can view/interact with content displayed on the first side 120a of the computing device 102. The opaque electrochromic material on the second side 120b of the two-way display device 108 can block the view of the bottom 122 of the base portion 106 of the computing device 102.

Referring to FIGS. 1C and 1D, in some implementations, when the computing device 102 is in a tablet mode of operation, the first side 120a of the two-way display device 108 can be opaque, while the second side 120b of the two-way display device can be transparent. The display controller 216 can provide a signal 218a (e.g., a voltage) to the electrochromic material applied to the back surface 212 of the first glass panel 208. The signal 218a causes the electrochromic material to become opaque, blocking anything located behind the first side 120a of the two-way display device 108 (e.g., the input area 110) from being viewed from the second side 120b of the two-way display device 108. In addition, the display controller 216 can remove a signal 218e (e.g., not apply a voltage) to the electrochromic material applied to the front surface 214 of the second glass panel 210. Removing/not applying the signal 218e causes the electrochromic material to become transparent, allowing the viewing of the display 202 from the second side 120b of the two-way display device 108.

In some implementations, the display controller 216 can remove the signal 218a (e.g., not apply a voltage) to the electrochromic material applied to the back surface 212 of the first glass panel 208. In addition, the display controller 216 can remove the signal 218e (e.g., not apply a voltage) to the electrochromic material applied to the front surface 214 of the second glass panel 210. For example, referring to FIGS. 1A and 1B, when in a laptop mode of operation, the display 202 can be viewed from the first side 120a and the second side 120b of the two-way display device 108 at the same time. A user viewing content on the first side 120a of the two-way display device 108 can view a mirror-image of the content on the second side 120b of the two-way display device 108. In some cases, this could be confusing to the user (e.g., text will be displayed in reverse order on the second side 120b of the two-way display device 108). In other cases, for example when displaying an image or picture, mirroring the image may not cause any user confusion.

In some cases, in implementations where the electrochromic material applied to the back surface 212 of the second glass panel 210 is transparent and the electrochromic material applied to the front surface 214 of the second glass panel 210 is transparent, the user, while viewing the two-way display device 108 from the first side 120a, may be able to view through the display 202, seeing items and objects in the field of view of the user that may be present behind the two-way display device 108.

In some implementations, the display 202 can include a first OLED display formed on the display first surface 222a of a panel and a second OLED display formed on the display second surface 222b of a panel. The display controller 216 can separately control the content displayed on the first OLED display and the second OLED display. In some implementations, in two-way display devices that include a first OLED display and a second OLED display, the first glass panel 208 and the electrochromic material applied to the back surface 212 of the first glass panel 208 can be omitted from the multiple layers included in the two-way display device 108. In addition or in the alternative, the second glass panel 210 and the electrochromic material applied to the front surface 214 of the second glass panel 210 can be omitted from the multiple layers included in the two-way display device 108. When using two OLED displays for the display 202, the panel can be opaque as the OLED displays are each viewed from a single side (the OLED displays do not need to be transparent).

For example, referring to FIGS. 1A and 1B, when in a laptop mode of operation, the display 202 can be viewed from the first side 120a and the second side 120b of the two-way display device 108 at the same time. The first OLED display can display content on the first side 120a of the two-way display device 108 and the second OLED display can display the same content, in the correct orientation, on the second side 120b of the two-way display device 108.

Referring to FIGS. 1C and 1D, when the computing device 102 is in a tablet mode of operation, the display controller 216 can provide a signal to the first OLED display that can disable the first OLED display (no content is displayed on the first OLED). The second OLED display can display content on the second side 120b of the two-way display device 108.

Referring to FIGS. 1E and 1F, when the computing device 102 is in an alternate tablet mode of operation, the display controller 216 can provide a signal to the second OLED display that can disable the second OLED display (no content is displayed on the first OLED). The first OLED display can display content on the first side 120a of the two-way display device 108.

In some implementations, the glass panels 208, 210 and the electrochromic material applied to the surfaces of each panel can be eliminated resulting in a two-way display device 108 that includes the display 202 and the touch panels 204, 206. In these implementations, a user of the computing device 102 can view the two-way display device 108 from the first side 120a and the second side 120b at the same time and can have the same experiences as when using the computing device 102 in the situation as described above where the electrochromic material applied to the front surface 214 of the second glass panel 210 is transparent and the electrochromic material applied to the back surface 212 of the first glass panel 208 is transparent.

In some implementations, the second glass panel 210 and the electrochromic material applied to the front surface 214 of the second glass panel 210 can be omitted from the multiple layers included in the two-way display device 108. In these implementations, referring to FIGS. 1A and 1B that show the computing device 102 in a laptop mode of operation, the first side 120a of the two-way display device 108 can be transparent. The display controller 216 can remove a signal 218a (e.g., not apply a voltage) to the electrochromic material applied to the back surface 212 of the first glass panel 208. Removing/not applying the signal 218a causes the electrochromic material to become transparent. A user of the computing device 102 can view the display 202 from the first side 120a of the two-way display device 108. The user, when viewing the display 202 from the first side 120a of the two-way display device 108, can see through the display 202 as there is no opaque backing on the display 202. In addition, the user can view the mirror image of the content viewed from the first side 120a of the two-way display device 108 from the second side 120b of the two-way display device 108.

Referring to FIGS. 1C and 1D that show the computing device 102 in a tablet mode of operation, in implementations where the second glass panel 210 and the electrochromic material applied to the front surface 214 of the second glass panel 210 are omitted from the multiple layers included in the two-way display device 108, the first side 120a of the two-way display device 108 can be opaque. The display controller 216 can provide a signal 218a (e.g., apply a voltage) to the electrochromic material applied to the back surface 212 of the first glass panel 208. Applying the signal 218a causes the electrochromic material to become opaque. A user of the computing device 102, when interacting with the computing device 102 in a tablet mode, can view the display 202 from the second side 120b of the two-way display device 108 while the computing device 102 is in a closed position. The user, when viewing the display 202 from the second side 120b of the two-way display device 108, will not be able to see through the display 202. The opaque electrochromic material will effectively block the user's view of the input area 110, providing the user with a pleasant tablet mode experience.

Referring to FIGS. 1E and 1F, in implementations where the second glass panel 210 and the electrochromic material applied to the front surface 214 of the second glass panel 210 are omitted from the multiple layers included in the two-way display device 108, when the computing device 102 is in an alternate tablet mode of operation, the two-way display device 108 can be placed in the same mode of operation as in the laptop mode of operation. The first side 120a of the two-way display device 108 can be transparent. A user can view/interact with content displayed on the first side 120a of the computing device 102. The user may also be able to view through the display 202, seeing the bottom 122 of the base portion 106 of the computing device 102.

In some implementations, the first glass panel 208 and the electrochromic material applied to the back surface 212 of the first glass panel 208 can be omitted from the multiple layers included in the two-way display device 108. In these implementations, referring to FIGS. 1A and 1B that show the computing device 102 in a laptop mode of operation, the first side 120a of the two-way display device 108 can be transparent. The display controller 216 can provide a signal 218e (e.g., apply a voltage) to the electrochromic material applied to the front surface 214 of the second glass panel 210. Providing/applying the signal 218a causes the electrochromic material to become opaque. A user of the computing device 102 can view the display 202 from the first side 120a of the two-way display device 108. The user, when viewing the display 202 from the first side 120a of the two-way display device 108, cannot see through the display 202. Removing/not applying the signal 218e causes the electrochromic material to become transparent. A user of the computing device 102 can view the display 202 from the first side 120a of the two-way display device 108. In addition, the user can view the mirror image of the content viewed from the first side 120a of the two-way display device 108 from the second side 120b of the two-way display device 108.

Referring to FIGS. 1C and 1D that show the computing device 102 in a tablet mode of operation, in implementations where the first glass panel 208 and the electrochromic material applied to the back surface 212 of the first glass panel 208 are omitted from the multiple layers included in the two-way display device 108, the first side 120a of the two-way display device 108 can be transparent and the second side 120b of the two-way display device 108 can also be transparent. The display controller 216 can remove a signal 218e (e.g., not apply a voltage) to the electrochromic material applied to the front surface 214 of the second glass panel 210. Removing/not applying the signal 218e causes the electrochromic material to become transparent. A user of the computing device 102, when interacting with the computing device 102 in a tablet mode, can view the display 202 from the second side 120b of the two-way display device 108 while the computing device 102 is in a closed position. The user, when viewing the display 202 from the second side 120b of the two-way display device 108, may also be able to see through the display 202 and view the input area 110.

Referring to FIGS. 1E and 1F, in implementations where the first glass panel 208 and the electrochromic material applied to the back surface 212 of the first glass panel 208 are omitted from the multiple layers included in the two-way display device 108, when the computing device 102 is in an alternate tablet mode of operation, the two-way display device 108 can be placed in the same mode of operation as in the laptop mode of operation. The first side 120a of the two-way display device 108 can be transparent, while the second side 120b can be opaque. A user can view/interact with content displayed on the first side 120a of the computing device 102. The user will not be able to view through the display 202, blocking a view of the bottom 122 of the base portion 106 of the computing device 102.

In some implementations, the display 202 included in the two-way display device 108 can be an OLED display formed on a display first surface 222a of a transparent glass panel. In these implementations, the display 202 can be viewed from both sides (the display first side 220a and the display second side 220b) because the glass panel is transparent. In addition, an electrochromic material can be applied to the display second surface 222b. The second glass panel 210 can be omitted from the multiple layers included in the two-way display device 108.

In these implementations, referring to FIGS. 1A and 1B that show the computing device 102 in a laptop mode of operation, the first side 120a of the two-way display device 108 can be transparent. The display controller 216 can remove a signal 218a (e.g., not apply a voltage) to the electrochromic material applied to the back surface 212 of the first glass panel 208. Removing/not applying the signal 218a causes the electrochromic material to become transparent. The display controller 216 can provide the signal 218e (e.g., apply a voltage) to the electrochromic material applied to the display second surface 222b. The signal 218e causes the electrochromic material to become opaque, blocking the view of the display 202 from the second side 120b of the two-way display device 108. In the alternative, the display controller 216 can a remove the signal 218e (e.g., not apply a voltage) to the electrochromic material applied to the display second surface 222b. The signal 218e causes the electrochromic material to become transparent, allowing the viewing of the display 202 from both the first side 120a of the two-way display device 108 and the second side 120b of the two-way display device 108.

Referring to FIGS. 1C and 1D that show the computing device 102 in a tablet mode of operation, in implementations where the display 202 included in the two-way display device 108 is an OLED display formed on a display first surface 222a of a transparent glass panel and an electrochromic material is applied to the display second surface 222b, the display controller 216 can remove the signal 218e (e.g., not apply a voltage) to the electrochromic material applied to the display second surface 222b. Removing/not applying the signal 218e causes the electrochromic material to become transparent. The first side 120a of the two-way display device 108 can be opaque. The display controller 216 can provide a signal 218a (e.g., apply a voltage) to the electrochromic material applied to the back surface 212 of the first glass panel 208. Applying the signal 218a causes the electrochromic material to become opaque. A user of the computing device 102, when interacting with the computing device 102 in a tablet mode, can view the display 202 from the second side 120b of the two-way display device 108 while the computing device 102 is in a closed position. The user will not be able to see-through the display 202 as the opaque electrochromic material applied to the back surface 212 of the first glass panel 208 will effectively block the user's view of the input area 110.

Referring to FIGS. 1E and 1F, in implementations where the display 202 included in the two-way display device 108 is an OLED display formed on a display first surface 222a of a transparent glass panel and an electrochromic material is applied to the display second surface 222b, when the computing device 102 is in an alternate tablet mode of operation, the two-way display device 108 can be placed in the same mode of operation as in the laptop mode of operation. The first side 120a of the two-way display device 108 can be transparent, while the second side 120b can be opaque. A user can view/interact with content displayed on the first side 120a of the computing device 102. The user will not be able to view through the display 202, blocking a view of the bottom 122 of the base portion 106 of the computing device 102.

In some implementations, the display 202 included in the two-way display device 108 can be an OLED display formed on a display second surface 222b of a transparent glass panel. In these implementations, the display 202 can be viewed from both sides (the display first side 220a and the display second side 220b) because the glass panel is transparent. In addition, an electrochromic material can be applied to the display first surface 222a. The first glass panel 208 can be omitted from the multiple layers included in the two-way display device 108.

In these implementations, referring to FIGS. 1A and 1B that show the computing device 102 in a laptop mode of operation, the first side 120a of the two-way display device 108 can be transparent. The display controller 216 can remove a signal 218a (e.g., not apply a voltage) to the electrochromic material applied to the display first surface 222a. Removing/not applying the signal 218a causes the electrochromic material to become transparent. The display controller 216 can provide the signal 218e (e.g., apply a voltage) to the electrochromic material applied to the front surface 214 of the second glass panel 210. The signal 218e causes the electrochromic material to become opaque, blocking the view of the display 202 from the second side 120b of the two-way display device 108. In the alternative, the display controller 216 can a remove the signal 218e (e.g., not apply a voltage) to the electrochromic material applied to the front surface 214 of the second glass panel 210. The signal 218e causes the electrochromic material to become transparent, allowing the viewing of the display 202 from both the first side 120a of the two-way display device 108 and the second side 120b of the two-way display device 108.

Referring to FIGS. 1C and 1D that show the computing device 102 in a tablet mode of operation, in implementations where the display 202 included in the two-way display device 108 is an OLED display formed on a display second surface 222b of a transparent glass panel and an electrochromic material is applied to the display first surface 222a, the display controller 216 can remove the signal 218e (e.g., not apply a voltage) to the electrochromic material applied to the front surface 214 of the second glass panel 210. Removing/not applying the signal 218e causes the electrochromic material to become transparent. The first side 120a of the two-way display device 108 can be opaque. The display controller 216 can provide a signal 218a (e.g., apply a voltage) to the electrochromic material applied to the display first surface 222a. Applying the signal 218a causes the electrochromic material to become opaque. A user of the computing device 102, when interacting with the computing device 102 in a tablet mode, can view the display 202 from the second side 120b of the two-way display device 108 while the computing device 102 is in a closed position. The user will not be able to see-through the display 202 as the opaque electrochromic material applied to the back surface 212 of the first glass panel 208 will effectively block the user's view of the input area 110.

Referring to FIGS. 1E and 1F, in implementations where the display 202 included in the two-way display device 108 is an OLED display formed on a display second surface 222b of a transparent glass panel and an electrochromic material is applied to the display first surface 222a, when the computing device 102 is in an alternate tablet mode of operation, the two-way display device 108 can be placed in the same mode of operation as in the laptop mode of operation. The first side 120a of the two-way display device 108 can be transparent, while the second side 120b can be opaque. A user can view/interact with content displayed on the first side 120a of the computing device 102. The user will not be able to view through the display 202, blocking a view of the bottom 122 of the base portion 106 of the computing device 102.

In some implementations, an electrochromic material may be applied over/on top of the surface of the OLED display. In these implementations, for example, a glass panel (e.g., the first glass panel 208 and/or the second glass panel 210) can be omitted from the multiple layers included in the two-way display device 108. In implementations where the OLED display is formed on a display first surface 222a of a transparent glass panel, as described above, the first glass panel 208 can be omitted. In these implementations, an electrochromic material can be applied to the display second surface 222b, further omitting the second glass panel 210. Alternatively, an electrochromic material can be applied to the front surface 214 of the second glass panel 210. In implementations where the OLED display is placed/overlayed/deposited on a display second surface 222b of a transparent glass panel, as described above, the second glass panel 210 can be omitted. In these implementations, an electrochromic material can be applied to the display first surface 222a, further omitting the first glass panel 208. Alternatively, an electrochromic material can be applied to the back surface 212 of the first glass panel 208.

In some cases, the computing device 102 can be placed in a closed position and not further used in a tablet mode. For example, a user of the computing device 102 may be finished using the device for a period of time and simply closes the lid portion 104. The computing device 102, sensing no further interactions by the user (e.g., no user inputs/contact with a touch-sensitive surface of the two-way display device 108), can determine that the user is no longer interacting with the computing device 102. In these cases, dependent on the implementation of the computing device 102, the first side 120a of the two-way display device 108, and/or the second side 120b of the two-way display device 108 may be opaque, blocking the view of the input area 110 from the second side 120b of the two-way display device 108. Alternatively, dependent on the implementation of the computing device 102, the first side 120a of the two-way display device 108, and the second side 120b of the two-way display device 108 may be transparent. As such, the input area 110 can be viewed from the second side 120b of the two-way display device 108.

The determination as to if the first side 120a or the second side 120b, or the first side 120a and the second side 120b are to be opaque or transparent can be based on a power consumption needed by the electrochromic material included in the two-way display device 108. For example, in order to conserve power in a low power operating mode of the computing device 102 when closed, no voltage may be applied to the electrochromic material included in the two-way display device 108, causing the first side 120a and the second side 120b to be transparent, allowing the input area 110 to be viewed from the second side 120b of the two-way display device 108.

In any of the implementations described above, the two-way display device 108 may include a single touch panel. For example, the first touch panel 204 may be omitted from the multiple layers included in the two-way display device 108. A user of the two-way display device 108 can use the display 202 as a touchscreen when operating the computing device 102 in a tablet mode as shown with reference to FIGS. 1C and 1D. In some implementations, the user may use the display 202 as a touchscreen when operating the computing device 102 in a laptop mode as shown with reference to FIGS. 1A and 1B, as well as when operating the computing device 102 in a tablet mode as shown with reference to FIGS. 1C and 1D. In other implementations, the display 202 may not operate as a touchscreen when the computing device 102 is in a laptop mode as shown with reference to FIGS. 1A and 1B, but may operate as a touchscreen when the computing device 102 in a tablet mode as shown with reference to FIGS. 1C and 1D. The ability of the display 202 to operate as a touchscreen in a laptop mode can be dependent on the width of the layers included in the two-way display device 108 and/or the type of touch panel included in the two-way display device.

In any of the implementations described above, the two-way display device 108 may include a single touch panel where the second touch panel 206 may be omitted from the multiple layers included in the two-way display device 108. In these implementations, the two-way display device 108 can be implemented such that a user of the two-way display device 108 can use the display 202 as a touchscreen when operating the computing device 102 in a laptop mode as shown with reference to FIGS. 1A and 1B, as well as when operating the computing device 102 in a tablet mode as shown with reference to FIGS. 1C and 1D.

One or more sensors can be included on a surface of a touch panel. The sensors can detect touch actions by a user of a computing device. The computing device can interpret the touch actions as commands and inputs to the computing device. In some implementations, a grid of electrodes can be deposited on a first surface 224a of the first touch panel 204, forming a touch-sensitive surface for the first touch panel 204. Alternatively, in other implementations, a grid of electrodes can be deposited on a second surface 224b of the first touch panel 204, forming a touch-sensitive surface for the first touch panel 204. In some implementations, a grid of electrodes can be deposited on a first surface 226a of the second touch panel 206, forming a touch-sensitive surface for the second touch panel 206. Alternatively, in other implementations, a grid of electrodes can be deposited on a second surface 226b of the second touch panel 206, forming a touch-sensitive surface for the second touch panel 206.

In some implementations, an electrochromic material can be applied to a surface of a touch panel (e.g., the surface that is not touch-sensitive), eliminating the inclusion of a separate glass panel from the multiple layers included in a two-way display device 108 (e.g., the two-way display device 108). In implementations where the touch-sensitive surface is included on the first surface 224a of the first touch panel 204, an electrochromic material can be applied to the second surface 224b of the first touch panel 204. In implementations where the touch-sensitive surface is included on the second surface 224b of the first touch panel 204, an electrochromic material can be applied to the first surface 224a of the first touch panel 204. In these implementations, the first glass panel 208 can be omitted from the multiple layers included in the two-way display device 108.

In implementations where the touch-sensitive surface is included on the first surface 226a of the second touch panel 206, an electrochromic material can be applied to the second surface 224b of the second touch panel 206. In implementations where the touch-sensitive surface is included on the second surface 226b of the second touch panel 206, an electrochromic material can be applied to the first surface 226a of the second touch panel 206. In these implementations, the second glass panel 210 can be omitted from the multiple layers included in the two-way display device 108.

In other implementations, where the display 202 includes a single OLED display, the touch-sensitive surface of a touch panel can be formed on a surface of the display 202. In some implementations, the OLED display can be formed on the display first surface 222a and the touch-sensitive surface can be formed on the display second surface 222b. In these implementations, the second touch panel 206 can be omitted from the multiple layers included in the two-way display device 108. In addition, in cases where a single touch panel can be used by the computing device 102, the first touch panel 204 can be omitted from the multiple layers included in the two-way display device 108. In some implementations, the OLED display can be formed on the display second surface 222b and the touch-sensitive surface can be formed on the display first surface 222a. In these implementations, the first touch panel 204 can be omitted from the multiple layers included in the two-way display device 108. In addition, in cases where a single touch panel can be used by the computing device 102, the second touch panel 206 can be omitted from the multiple layers included in the two-way display device 108.

Figure 3:
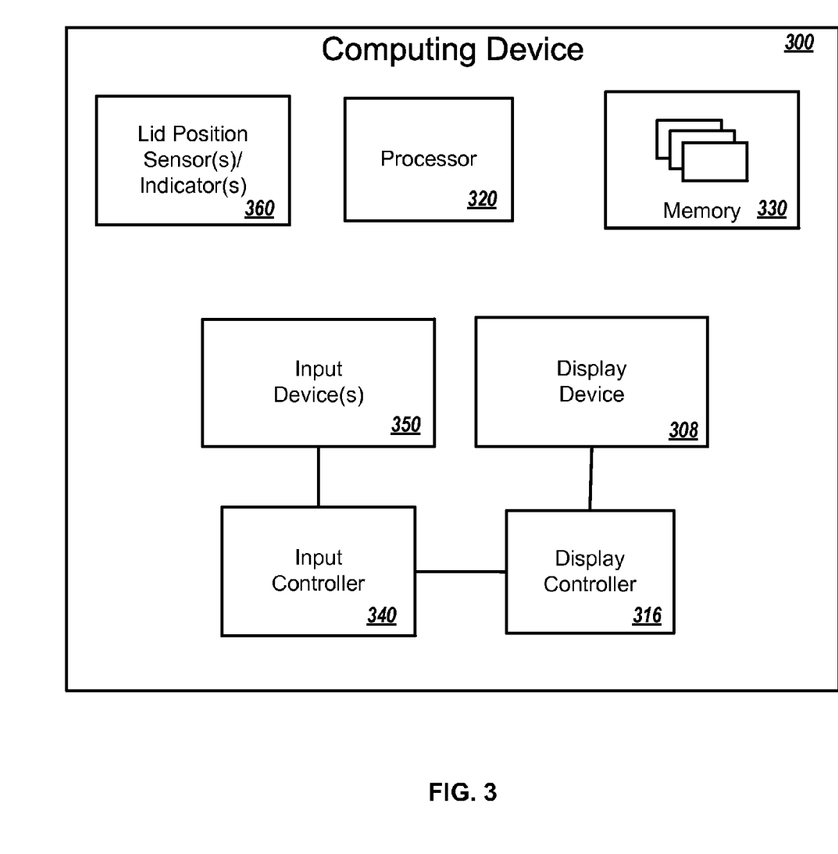
FIG. 3 is a block diagram illustrating example modules included in a computing device.
Figure 4:
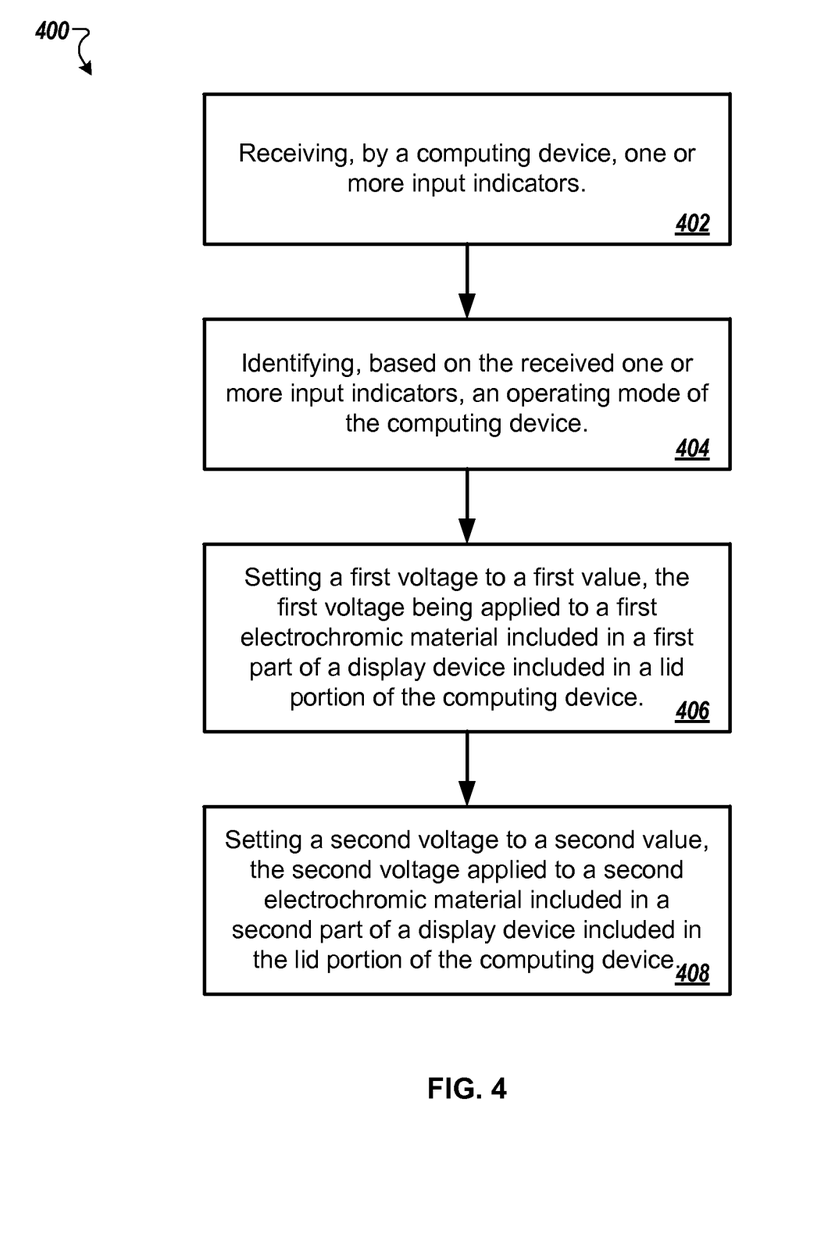
FIG. 4 is a flowchart that illustrates a method of operating a computing device that includes the herein described display device.

FIG. 3 is a block diagram illustrating example modules included in a computing device 300. For example, the computing device 300 can be the computing device 102, as shown in FIGS. 1A-F. In the example of FIG. 4, the computing device 300 includes a processor 320, memory 330, an input controller 340 and a display controller 316. The display controller 316 is operatively coupled/connected to a display device 308. For example, the display controller 316 can be the display controller as shown in FIG. 2 and the display device 308 can be the two-way display device 108 as shown in FIGS. 1A-F and FIG. 2.

The input controller 340 can receive input data from one or more input devices 350. The input devices 350 can be one or more input devices a user of the computing device 300 may interact with, for example, to provide input to an application running on the computing device 300. For example, the processor 320 may execute an application that may be stored in the memory 330. The application can display a user interface on the display device 308 included in the computing device 300.

The user can interact with one or more of the input devices 350 (e.g., included in the input area 110) in order to interact with and/or provide input to the application. The input devices 350 can include, but are not limited to, a keyboard (e.g., keyboard 112), a trackpad (e.g., trackpad 114), a pointing device (e.g., pointer button 116), and mouse buttons (e.g., mouse buttons 118a-d). In some implementations, the display device 308 can be a two-way display device (e.g., two-way display device 108) and can be implemented according to any of the herein described implementations. In implementations where the display device 308 is implemented as a touch-sensitive two-way display device (e.g., the two-way display device 108), the display device 308 can include a touch-sensitive first side (e.g. the first side 120a) and a touch sensitive second side (e.g., the second side 120b). A user can interact with the first side of the display device 308 while using the computing device 300 in a laptop mode of operation.

As described with reference to FIG. 2, the display controller 316 can provide control signals to the display device 308 to cause an electrochromic material in the first side of the display device 308 to become transparent and to cause an electrochromic material in the second side of the display device 308 to become opaque.

The display controller 216 can provide a signal 218e (e.g., a voltage) to the electrochromic material applied to the front surface 214 of the second glass panel 210. The signal 218e causes the electrochromic material to become opaque, blocking the view of the display 202 from the second side 120b of the two-way display device 108. In addition, the display controller 216 can remove a signal 218a (e.g., not apply a voltage) to the electrochromic material applied to the back surface 212 of the first glass panel 208. Removing/not applying the signal 218a causes the electrochromic material to become transparent, allowing the viewing of the display 202 from the first side 120a of the two-way display device 108.

One or more lid position sensors/indicators 360 can provide the computing device 300 with an indication of the position of a lid of the computing device (e.g., the lid portion 104) with respect to the base of the computing device (e.g., the base portion 106). The lid position sensors/indicators 360 can include but are not limited to inductive, capacitive, mechanical, magneto-resistive, Hall effect, and optical sensors.

The lid position sensors/indicators 360 can include an accelerometer placed/located in the lid portion 104 of the computing device 102 and an accelerometer placed/located in the base portion 106 of the computing device 102 that can be used to determine an angle of the lid portion 104 with respect to the base portion 106 of the computing device 102. The determined angle can be indicative of the operating mode of the computing device 102.

In some implementations, the lid position sensors/indicators 360 can include a sensor/indicator that provides the computing device 102 with an indication that the computing device 102 is to be used in a tablet mode of operation. As described, a user of the computing device 102 can use the computing device 102 in a tablet mode when the computing device 102 is in a closed position, as shown in FIGS. 1C and 1D. The computing device 102 can receive an indication that the user intends to use the computing device 102 as a tablet and that the user did not just close the computing device 102 with no further intention of continuing to use the computing device 102. In some implementations, as described with reference to FIGS. 1C and 1D, a user of the computing device 102 can press the mode indication switch 124 any time after closing the computing device 102 if the user intends to use the computing device 102 in a tablet mode of operation.

In some implementations, when the computing device 102 is in the closed position, the second side 120b of the two-way display device 108 can display an input icon that a user of the computing device 102 can interact with, placing the computing device 102 into a tablet mode of operation. For example, the second side 120b of the two-way display device 108 can display an icon (e.g., a button, a slide switch) that when touched/activated by the user when interacting with the second side 120b of the two-way display device 108 puts the computing device 102 into a tablet mode of operation. If the user does not interact with the second side 120b of the two-way display device 108 (for example the user does not touch the icon within a specific time frame (e.g., 30 seconds)), the computing device 102 can transition to a low power or power-down mode of operation while continuing to display the icon. Later interaction of the user with the second side 120b of the two-way display device 108 can wake-up the computing device 102 and place it into a tablet mode of operation.

FIG. 4 is a flowchart that illustrates a method 400 of operating a computing device that includes the herein described display device. According to this example, the method 700 includes receiving, by a computing device, one or more input indicators (402). The method 700 also includes identifying, based on the received one or more input indicators, an operating mode of the computing device (404). For example, the input indicator can indicate that the computing device is in one of a laptop or tablet mode of operation. Based on identifying the operating mode of the computing device, the method 700 further includes setting a first voltage to a first value, the first voltage being applied to a first electrochromic material included in a first part of a display device included in a lid portion of the computing device (406). Also based on identifying the operating mode of the computing device, the method 700 further includes setting a second voltage to a second value, the second voltage applied to a second electrochromic material included in a second part of a display device included in the lid portion of the computing device (408).

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium, a non-transitory computer-readable storage medium, a tangible computer-readable storage medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

A number of implementations have been described. Nevertheless, it will be understood that various modifications may be made without departing from the spirit and scope of the herein described implementations.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computing device comprising:
   a base;
   a lid coupled to the base, the lid housing a display device comprising:
   a first electrochromic material;
   a second electrochromic material; and
   an organic light emitting diode (OLED) display, wherein the OLED display is located between the first electrochromic material and the second electrochromic material; and
   at least one lid position sensor configured to provide an indication of a position of the lid with respect to the base.

2. The computing device of claim 1, further comprising
   a first glass panel including a first side and a second side, and wherein the first electrochromic material is applied to the second side of the first glass panel; and
   a second glass panel including a first side and a second side, and wherein the second electrochromic material is applied to the first side of the second glass panel.

3. The computing device of claim 1, wherein the OLED display is included in a third glass panel, the OLED display being formed on a side of the third glass panel.

4. The computing device of claim 1, wherein the display device further comprises a first touch sensitive panel.

5. The computing device of claim 4, wherein the first touch sensitive panel is located between the first electrochromic material and the OLED display.

6. The computing device of claim 4, wherein the first touch sensitive panel is located between the second electrochromic material and the OLED display.

7. The computing device of claim 6,
   wherein the display device further comprises a second touch sensitive panel; and
   wherein the second touch sensitive panel is located between the first electrochromic material and the OLED display.

8. The computing device of claim 1, further comprising a display controller coupled to each of the first electrochromic material, the second electrochromic material, and the OLED, the display controller being configured to apply control signals to the first electrochromic material, the second electrochromic material, and the OLED display.

9. A display device comprising:
   a first glass panel part including a first side and a second side;
   a second glass panel part including a first side and a second side;
   a third glass panel part including an organic light emitting diode (OLED) display, a first side and a second side, the OLED display being formed on the first side;
   a first touch sensitive panel including a first side and a second side; and
   a second touch sensitive panel including a first side and a second side;
   wherein a first electrochromic material is applied to the second side of the first glass panel part;
   wherein a second electrochromic material is applied to the first side of the second glass panel part;
   wherein the third glass panel part is located between the first touch sensitive panel and the second touch sensitive panel, the first side of the third glass panel part being located adjacent to the second side of the first touch sensitive panel, and the second side of the third glass panel part being located adjacent to the first side of the second touch sensitive panel;
   wherein the second side of the first glass panel part is located adjacent to the first side of the first touch sensitive panel; and
   wherein the first side of the second glass panel part is located adjacent to the second side of the second touch sensitive panel.

10. The display device of claim 9, further including a display controller coupled to each of the first electrochromic material, the second electrochromic material, and the OLED, the display controller being configured to apply control signals to the first electrochromic material, the second electrochromic material, and the OLED display.

11. The display device of claim 10,
wherein a first control signal is applied to the first electrochromic material causing the first electrochromic material to become either transparent or opaque based on an operating mode of the display device, and
wherein a second control signal is applied to the second electrochromic material causing the second electrochromic material to become either transparent or opaque based on the operating mode of the display device.

12. The computing device of claim 1,
wherein the lid includes a front side and a rear side, and
wherein the lid is configured to house the display device so that content rendered on the display device can be viewed from the front side and the rear side.

13. The computing device of claim 8, wherein the control signals are applied to the first electrochromic material, the second electrochromic material, and the OLED display based on the provided indication of the position of the lid of the computing device with respect to the base of the computing device.

14. The computing device of claim 13, wherein the provided indication of the position of the lid of the computing device with respect to the base of the computing device is for a laptop operating mode of the computing device.

15. The computing device of claim 14,
wherein a first control signal is applied to the first electrochromic material causing the first electrochromic material to become transparent, and
wherein a second control signal is applied to the second electrochromic material causing the second electrochromic material to become opaque.

16. The computing device of claim 13, wherein the provided indication of the position of the lid of the computing device with respect to the base of the computing device is for a tablet operating mode of the computing device.

17. The computing device of claim 16,
wherein a first control signal is applied to the first electrochromic material causing the first electrochromic material to become opaque, and
wherein a second control signal is applied to the second electrochromic material causing the second electrochromic material to become transparent.

18. The computing device of claim 1, wherein the lid position sensor is one of an inductive sensor, a capacitive sensor, a mechanical sensor, a magneto-resistive sensor, a Hall effect sensor, and an optical sensor.

19. A method of forming a two-way display device comprising:
forming an organic light emitting diode (OLED) display on a first side of a first glass panel part;
applying a first electrochromic material to a side of a second glass panel part;
applying a second electrochromic material to a side of a third glass panel part;
placing a first touch sensitive panel between the first glass panel part and the second glass panel part, the placing positioning a first side of the first touch sensitive panel adjacent to a second side of the first glass panel part and positioning a second side of the first touch sensitive panel adjacent to the side of the second glass panel part; and
placing a second touch sensitive panel between the first glass panel part and the third glass panel part, the placing positioning a first side of the second touch sensitive panel adjacent to the first side of the first glass panel part and positioning a second side of the second touch sensitive panel adjacent to the side of the third glass panel part.

20. The method of claim 19, wherein the OLED display is formed on the second side of the first glass panel part.

* * * * *